No. 648,018.  
Patented Apr. 24, 1900.  
H. F. BORBEIN.  
SPRING BEARING.  
(Application filed Dec. 8, 1899.)  
(No Model.)  
2 Sheets—Sheet 1.
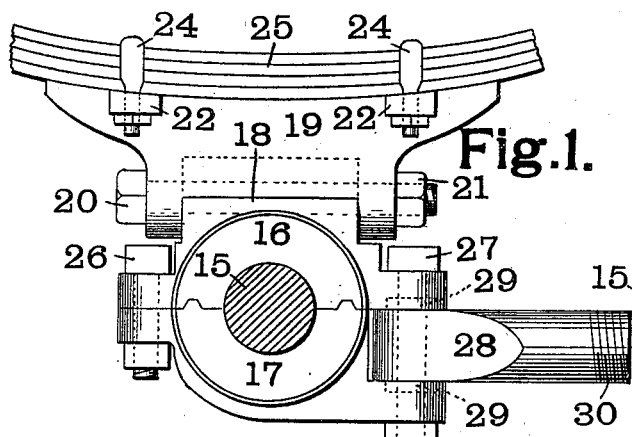
Fig.1.
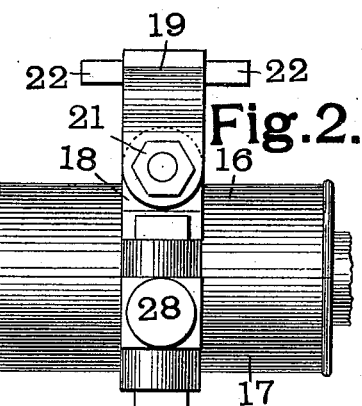
Fig.2.
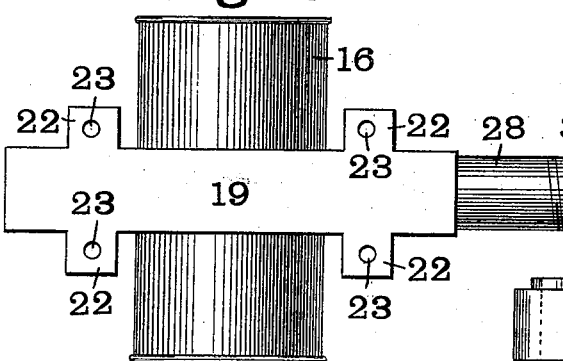
Fig.3.
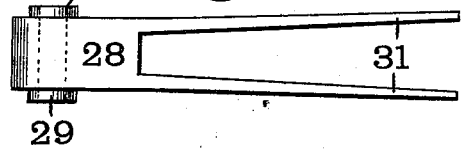
Fig.4.
Fig.5.
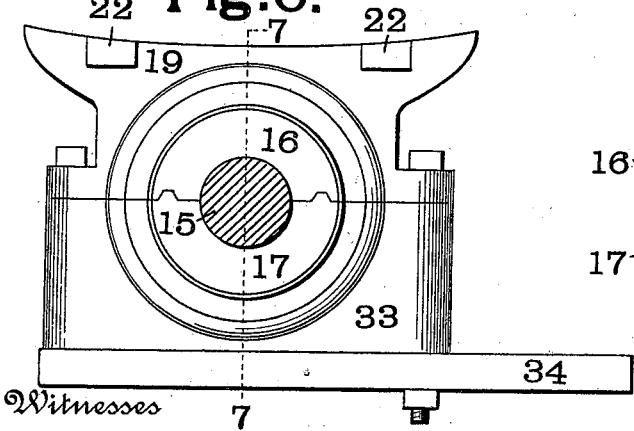
Fig.6.
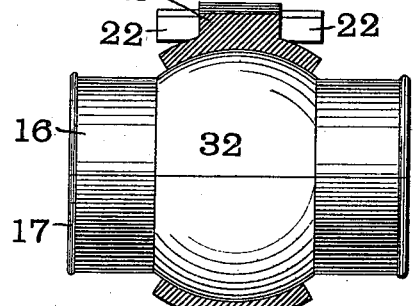
Fig.7.
Witnesses  
W. A. Alexander  
David Stannard
Inventor  
Henry F. Borbein  
By Attorneys  
Fowler & Fowler No. 648,018. Patented Apr. 24, 1900.
H. F. BORBEIN.
SPRING BEARING.
(Application filed Dec. 8, 1899.)
(No Model.) 2 Sheets—Sheet 2.
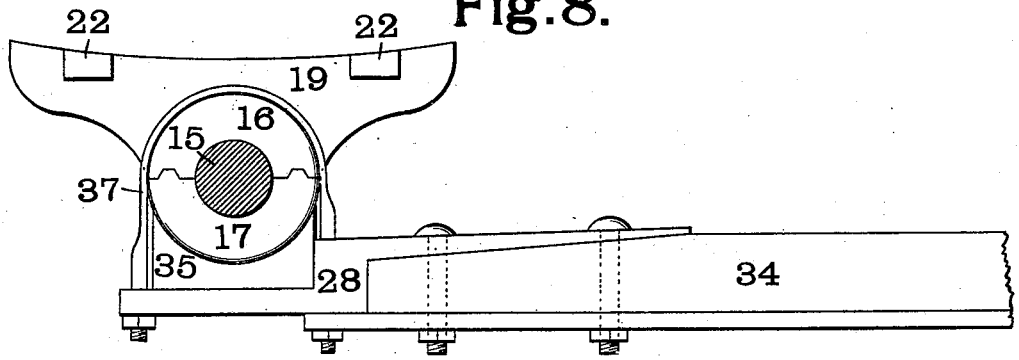
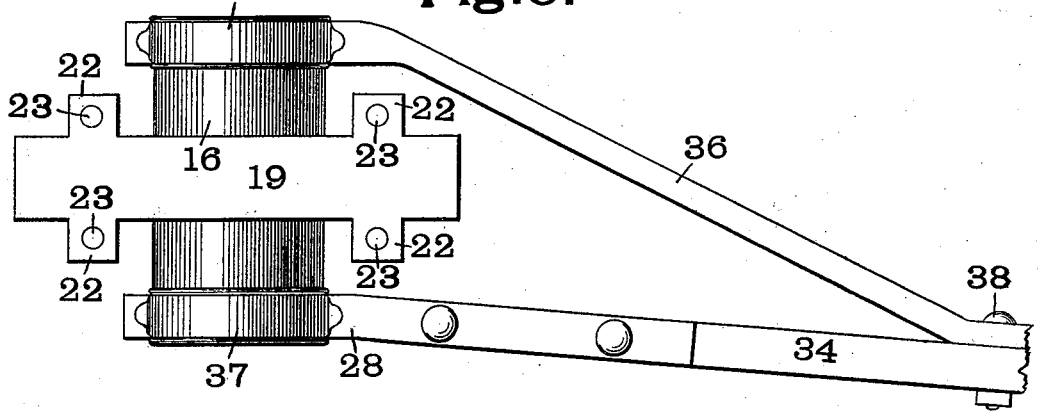
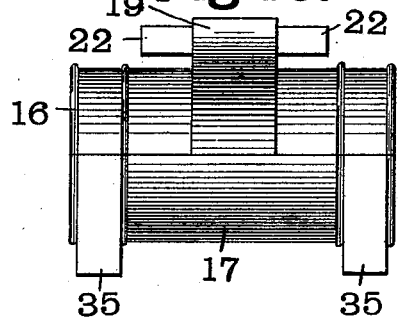
Witnesses
W. H. Alexander
David Stannard
Inventor
Henry F. Borbein
By Attorneys
Fowler & Fowler

UNITED STATES PATENT OFFICE.

HENRY F. BORBEIN, OF ST. LOUIS, MISSOURI.

SPRING-BEARING.

SPECIFICATION forming part of Letters Patent No. 648,018, dated April 24, 1900.

Application filed December 8, 1899. Serial No. 739,622. (No model.)

*To all whom it may concern:*

Be it known that I, HENRY F. BORBEIN, a citizen of the United States, residing at the city of St. Louis, in the State of Missouri, have invented a certain new and useful Spring-Bearing, of which the following is such a full, clear, and exact description as will enable any one skilled in the art to which it appertains to make and use the same, reference being had to the accompanying drawings, forming part of this specification.

My invention relates to spring-bearings—that is, bearings which are adapted to be secured to the spring of a vehicle—and is more particularly adapted for use on the driving-axle of motor-vehicles.

My invention consists in part in the combination, with a bearing, of a spring-block carried by said bearing, means for securing said spring-block to a spring, and means for securing a reach to said bearing.

My invention also consists in part in the combination, with a bearing, of a spring-block carried by said bearing, a reach secured to said bearing, and means for allowing movement between said spring-block and bearing and said reach and bearing.

My invention also consists in various other novel features and details of construction, all of which are described in the following specification and pointed out in the claims affixed hereto.

In the accompanying drawings, Figure 1 is an end view of my preferred form of bearing. Fig. 2 is a side view. Fig. 3 is a top plan view. Fig. 4 is a section showing a detail of construction. Fig. 5 is a detailed view of a reach end. Fig. 6 is an end view of a modification. Fig. 7 is a side view, partly in elevation and partly in section, on the line 7 7 of Fig. 6. Fig. 8 is an end view of still another modification. Fig. 9 is a top plan view of the same; and Fig. 10 is a side view of the same, the reach and stay being omitted.

Like marks of reference refer to similar parts in the several views of the drawings.

15 is the axle.

The bearing is preferably formed of an upper part 16 and a lower part 17, so as to allow of its being readily placed in position around the axle 15.

The bearing may either be a plain bearing or may be provided with rollers, balls, or other antifriction devices.

In the preferred form of my bearing, as shown in Figs. 1 to 5, the upper part 16 of the bearing is provided with an upwardly-projecting portion 18, which has a convex top corresponding to a concave face in the lower part of the spring-block 19. The spring-block 19 is secured to the upwardly-projecting portion 18 by means of a bolt 20 and nut 21. This construction gives a wearing-surface between the said block 19 and upwardly-projecting part 18 independent of the bolt 20, which merely holds the parts together and does not furnish the wearing-surface. The spring-block 19 has formed on it lugs 22, provided with perforations 23 for the reception of the ends of clips 24, which secure the said block 19 to the spring 25, Fig. 1. This obviates the use of spring-plates or clip-bars and furnishes a neat and ready method of securing the spring-block to the spring.

The upper and lower parts 16 and 17 of the bearing are secured together by means of bolts 26 and 27. The bolt 27 also secures in position a reach end 28. The reach end 28 is provided with bosses 29, which project into suitable recesses in the parts 16 and 17, thus providing a wearing-surface between the reach end and bearing independent of the bolt 27. The reach end may be threaded at 30, as shown in Figs. 1 and 3, so that it may be secured to a reach formed of metal tubing, or it may be bifurcated, as in 31 of Fig. 5, so as to receive between its arms a wooden reach. The pivoting of the spring-block 19 to the bearing prevents any binding of the bearing on the axle when one of the wheels passes into a depression or over an obstruction, which would otherwise take place. The pivoting of the reach 28 to the bearing prevents any strain being communicated to the bearing by the said reach.

In the modification shown in Figs. 6 and 7 the bearing has formed at its central portion a spherically-shaped part 32, which fits in corresponding recesses in the spring-block 19, and a block 33. This construction allows of movement between the spring-block and the bearing, as in the one above described. The reach 34 is secured directly to the block 33 and also has movement with respect to the bearing owing to the ball-and-socket joint above described.

In Figs. 8, 9, and 10 is shown a simpler form of the bearing, which may be used in cases where it is not desired to have movement between the spring-block and bearing or between the reach and bearing. In this construction the spring-block 19 is formed integral with the upper half 16 of the bearing, and the lower part 17 of the bearing has formed integral with it two downwardly-projecting portions 35. To these downwardly-projecting portions 35 are secured the reach end 28 and a stay 36 by means of clips 37. The stay 36 is secured to the reach 34 by means of a bolt 38.

Having fully described my invention, what I claim as new, and desire to secure by Letters Patent of the United States, is—

1. The combination with an axle-bearing, of a spring-block carried thereby, lugs on said spring-block for securing it to a spring, and means for securing a reach to said bearing.

2. The combination with a rotating axle, of a bearing therefor, and a spring-block pivoted to said bearing so as to swing in a plane substantially parallel with said axle.

3. The combination with a rotating axle, of a bearing therefor, and a reach pivotally secured to said bearing so as to swing in a plane substantially parallel with said axle.

4. The combination with an axle-bearing, of a spring-block carried by said bearing, means for permitting movement between said spring-block and bearing, means for securing a reach to said bearing, and means for permitting movement between said reach and bearing.

5. The combination with an axle-bearing, of a spring-block pivotally mounted on said bearing, and a reach pivotally secured to said bearing.

6. The combination with an axle-bearing, of a reach, a bolt pivoting said reach to said bearing, and a wearing-surface between said reach and bearing independent of said bolt.

In testimony whereof I have hereunto set my hand and affixed my seal in the presence of the two subscribing witnesses.

H. F. BORBEIN. [L. S.]

Witnesses:
W. A. ALEXANDER,
WM. T. JONES.